April 28, 1964  C. H. WICKENBERG ETAL  3,130,663
COFFEE MAKER FILTER ASSEMBLY
Filed June 29, 1961
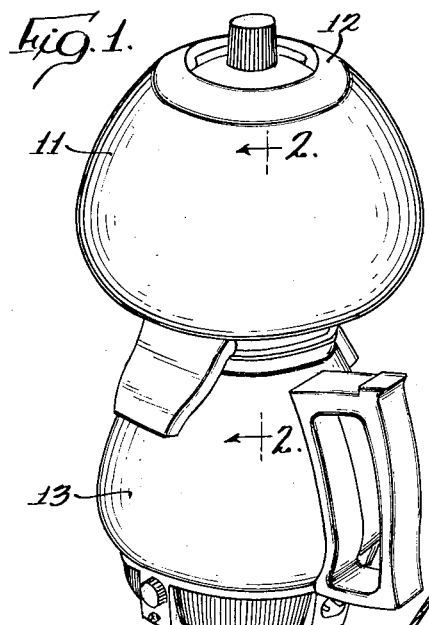
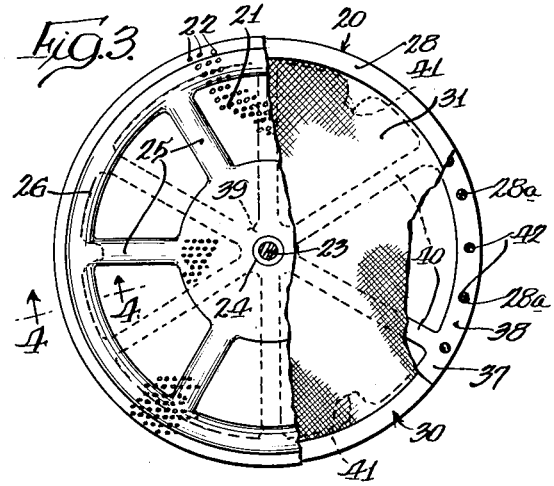
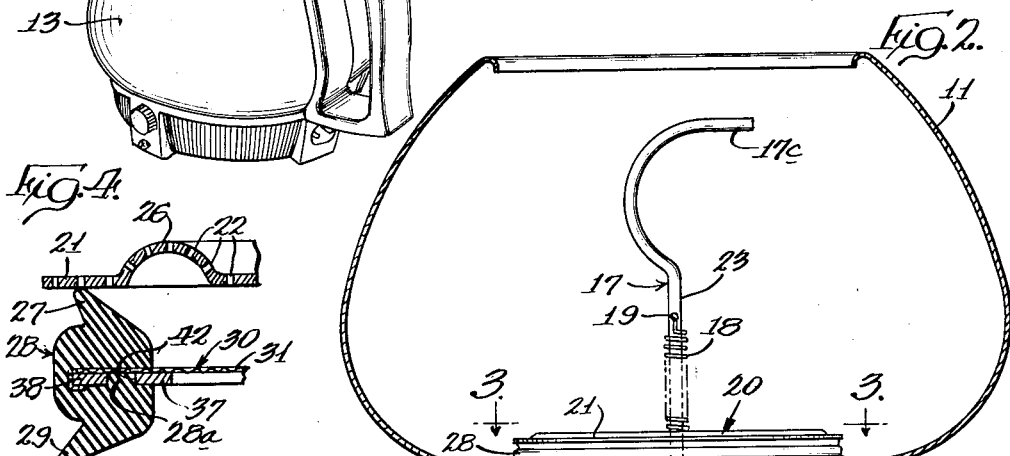
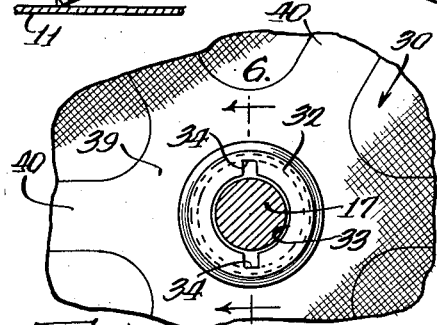
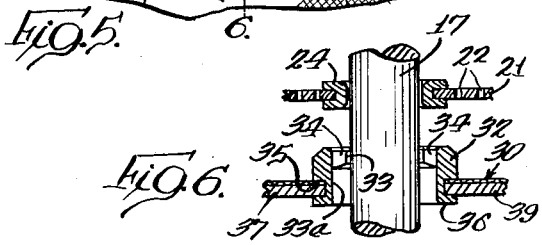
INVENTORS:
Chester H. Wickenberg
Moises B. Lorenzana
By George R. Clark  Atty

United States Patent Office 3,130,663
Patented Apr. 28, 1964

3,130,663
COFFEE MAKER FILTER ASSEMBLY
Chester H. Wickenberg, Elgin, and Moises B. Lorenzana, Glen Ellyn, Ill., assignors to Sunbeam Corporation, Chicago, Ill., a corporation of Illinois
Filed June 29, 1961, Ser. No. 120,740
11 Claims. (Cl. 99—292)

The present invention relates to filters and more specifically to filters for use with coffee makers of the vacuum type. While the filter is suitable for use in any vacuum coffee maker, a preferred form of vacuum coffee maker in which our filter assembly may be used is disclosed and claimed in our copending application Serial No. 117,079, filed June 14, 1961, and assigned to the same assignee as the instant application.

In coffee makers of the vacuum type, there is usually a lower vessel within which water is heated and an upper vessel within which the coffee grounds to be infused are placed. A filter is necessary between the two vessels to permit the water first to move from the lower to the upper vessel and then to permit the coffee liquor to return to the lower vessel while retaining the coffee grounds in the upper vessel at all times.

It has been found that the prior art coffee maker filters of this type are, in certain instances, very unsatisfactory or even inoperative. There seem to be two factors which contribute to the improper operation of the foraminous screen type filter. One of these factors is a function of the fineness of the coffee grind or the presence of powdered coffee in the coffee grounds. Inasmuch as the satisfactory operation of the foraminous type filter is dependent upon the many minute openings in the filter remaining relatively unobstructed, any material which tends to clog these openings and prevent the flow of the coffee liquor therethrough renders the filter ineffective. The degree of clogging of the openings varies considerably depending on the type of coffee and type of grind purchased. Also the condition and sharpness of the grinding machines of the coffee company can vary the amount of powdered coffee produced. When coffee is finely ground or in a powdered condition, it tends to lodge in the minute openings in the filter screen causing obstructed flow therethrough and increasing the filtering time materially. In some instances the filtering action is simply slowed down, while in other cases it is almost stopped completely.

The other factor which adversely affects the filtering time when using a foraminous or porous sheet type filter is the nature of the water employed in making the coffee. Extensive experimentation has revealed that minerals contained in the water in certain areas or the use of certain water softening chemicals combine with coffee oils to coat the foraminous filter sheet with an insoluble soap-like substance which greatly slows the filtering action. It would be desirable, therefore, if some means could be provided which would improve the rate of flow of the coffee liquor past the foraminous filter sheet to the lower vessel when the above-described phenomena caused by powdered coffee or mineral containing water has partially or totally clogged the foraminous or screen type filter. Since this type filter is both simple and effective, it would be preferable to eliminate the effect of undesirable characteristics associated with such filters without making them appreciably more complicated.

Accordingly, an object of the present invention is the provision of an improved filter that may be quickly and easily installed in a coffee maker to perform an efficient filter action.

Another object of the invention is to provide an improved coffee maker filter which will substantially lessen filtering time when the filter screen is partially or totally clogged.

A further object of this invention is to provide an improved foraminous type filter which will rapidly and effectively filter a coffee solution containing finely ground coffee and soap-like substances.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is a perspective view of a vacuum type coffee maker employing the filter of the instant invention;

FIG. 2 is a fragmentary sectional view of the upper vessel of the coffee maker;

FIG. 3 is a top plan view of the filter assembly with certain portions thereof cut away;

FIG. 4 is an enlarged fragmentary sectional view taken substantially along line 4—4 of FIG. 3;

FIG. 5 is an enlarged fragmentary top view of FIG. 3 showing the bushing and porous screen assembly; and FIG. 6 is a sectional view taken substantially along line 6—6 of FIG. 5.

Referring now to the drawings, and specifically to FIGS. 1 and 2 thereof, the invention is shown embodied in a filter for a coffee maker of the infusion type which consists of an upper vessel 11 with its top cover 12 and a lower vessel 13 having the thermostatic controls to regulate the automatic coffee making cycle. The construction of the coffee maker is described in detail in our copending application Serial No. 117,079 filed June 14, 1961. The upper vessel 11 is formed with a depending cylindrical well portion 14 at the bottom thereof to facilitate establishment of a seal between the upper vessel 11 and the lower vessel 13. Conduit 15 is attached to the bottom of well portion 14 and serves as a conduit for liquid passing between the upper and lower vessels. A gasket O-ring means 16 encircles the well 14 to ensure an air-tight seal between the vessels.

In the operation of a vacuum type coffee maker, the water heated in the lower vessel 13 is forced upwardly through conduit 15 into the upper vessel 11. In the upper vessel 11, the coffee grounds and hot water are brought together to produce the coffee liquor. A filter generally designated as 20 must be provided to permit the coffee liquor to return to the lower vessel while retaining the coffee grounds in the upper vessel.

Referring to FIGS. 3 and 4, the filter assembly 20 consists of an upper perforated disk 21, a foraminous screen assembly 30, and an elongated assembly rod 23. The thin stainless steel perforated disk 21 has a plurality of apertures 22 which allow the coffee liquor to pass therethrough but will retain the normal size coffee grounds. The size of these apertures must have a definite relationship to the sizes of other filtering portions of the assembly as will hereinafter be explained. The perforated disk 21 is slidably supported on the elongated assembly rod 23 by means of a stainless steel eyelet 24 centrally attached thereto. The eyelet 24 protects the disk 21 from wear and provides accurate control of the clearance between rod and disk which also governs the size of coffee grounds permitted to pass by the disk. A network of radially extending spoke-like ridges 25 interconnected with a circular ridge 26 near the periphery are formed on the disk 21 to provide sufficient rigidity so that the disk 21 does not flex when subjected to pressure during filtering. The disk 21 must remain flat to maintain an effective seal with adjacent gasket member 28.

The foraminous filter assembly 30, as may best be seen in FIGS. 3, 4 and 5, consists of a foraminous sheet 31, a supporting frame 37 for the foraminous sheet 31, a filter bushing 32 forming the hub of the assembly, and a molded gasket 28 which performs the dual function of providing a seal between the bottom of the upper vessel 11 and the foraminous sheet 31 and also between the foraminous sheet 31 and the perforated disk 21. The filter screen or sheet 31 is adapted to permit the flow of coffee liquor therethrough while obstructing the passage of grounds from the upper vessel to the conduit 15. The foraminous sheet may be made of paper or cloth but in the instant embodiment it is formed of drawn stainless steel wire woven to provide a screen of the order of 200 mesh. While the dimensions of the openings in the screen may vary considerably, a screen formed of stainless steel wire, .0021 of an inch in diameter and with about 33.6 percent open space has been found to be very satisfactory.

The supporting frame 37 may comprise a metal stamping including an annular rim portion 38, a central hub portion 39 being capable of receiving the filter bushing 32, and a plurality of radially extending spokes 40 which interconnect the rim 38 and hub 39. At positions intermediate the spokes 40, there are integrally formed with the annular rim portion 38 a plurality of positioning fingers 41. The positioning fingers 41 depend out of the plane of the rim portion 38 and the spokes 40, as is clearly shown in FIG. 2 and extend into the well portion 14 to center or locate the filter assembly 20 with respect to the vessel 11. It will be appreciated that these fingers are somewhat spring-like and serve to guide the filter 20 into position while it is being seated in vessel 11. Preferably, the extreme ends of the fingers 41 are curved, as shown in FIG. 2, to facilitate the positioning of the filter 20. For a purpose which will become apparent as the following description proceeds, the rim portion 38 of the frame 37 is provided with a plurality of openings 42.

The screen or foraminous sheet 31 is supported by supporting frame 37. As illustrated in FIG. 4, the sheet 31 is slightly larger in diameter than the annular rim portion 38, and the peripheral edge thereof is rolled around the supporting frame 37. In this way the sheet may be stretched taut and so held by the sheet supporting frame 37.

The filter sheet 31 and the supporting frame 37 are retained in assembled relation by the gasket 28, which is made of synthetic rubber or the like. The gasket 28 is molded around and completely encloses the annular rim portion 38 of the frame 37 and outer edge of sheet 31. The molded gasket 28, furthermore, includes portion 28a which extends through the openings 42 so that the foraminous sheet 31 is engaged on both sides thereof by the molded material, and in fact, portions of the molded material move into the interstices in the foraminous sheet 31. With this arrangement, the gasket 28 is completely integral with the foraminous sheet 31 and the supporting frame 37, and will not become separated therefrom or allow coffee residue to collect therein.

In order to ensure a satisfactory seal between the perforated disk 21 and the foraminous sheet 31, the gasket 28 on the outer edge of filter assembly 30 is provided with an extending upper annular lip 27 for resiliently engaging the bottom surface of the perforated disk 21, as is clearly illustrated in FIG. 4. The perforated disk 21 is designed to prevent the coffee grounds from effectively blocking the minute openings in the sheet 31 by lying thereon. The gasket 28 is required to prevent coffee grounds from bypassing the disk 21 and moving into the area immediately above sheet 31 where such blocking of the screen openings would occur. The upper lip 27 is of sufficient resilient material and the lip is of such a design as to conform to any irregularity of the perforated disk 21. The diameter of gasket 28 at the top of the upper lip 27 is smaller than the diameter of the perforated disk 21 to ensure that the top of the lip 27 will always come into contact with the underside of the disk 21. Similarly, the lower annular lip 29 of gasket 28 extends downwardly to form an intimate seal with lower inside surface of upper vessel 11 adjacent the well 14. The lower lip 29 as the upper lip 26 has a tapered edge to give additional resiliency to compensate for any irregularity which might occur on the bottom of vessel 11. The lower lip 29, therefore, provides an effective seal preventing any coffee grounds or sediment from circumventing the filter assembly 20.

Centrally located in the hub portion 39 of supporting frame 37 is the circular stainless steel filter bushing 32, as can best be seen in FIGS. 5 and 6. The filter bushing 32 is rigidly attached to both the supporting frame 37 and the foraminous sheet 31 by curling over the bottom portion of the bushing 36 in such a manner as to grip tightly both the frame 37 and sheet 31 between the bottom portion 36 and the bushing shoulder 35. In order to permit the filter assembly 20 to be mounted on the elongated assembly rod 23, an opening 33 is located concentrically in the bushing 32. The opening 33 is provided with an enlargement 33a concentric therewith and immediately below it to permit bushing 32 to travel along a curved portion in the assembly rod 23. Without the enlargement 33a, assembly of the filter assembly 20 over the curved portion of filter assembly rod 23 would be impossible since opening 33 must be a close sliding fit with the filter rod to prevent uncontrolled passage of coffee liquor and grounds from the upper vessel to the lower vessel without passing through either the disk 21 or the sheet 31. Thus the length along the bore of opening 33 must be relatively short to enable the foraminous filter assembly 30 to negotiate the tortuous filter rod.

A plurality of substantially rectangular by-pass openings 34 are formed in filter bushing 32, the openings 34 extending radially outwardly from the opening 33. The by-pass openings 34 are provided to permit the coffee liquor to pass from the upper vessel 11 to the lower vessel 13 when the foraminous sheet 31 has become inoperative due to clogging of its minute passageways by either finely powdered coffee or the soap-like substance produced from the interaction of minerals in the water and coffee oils. Without the by-pass openings 34, the vacuum created in the lower vessel 13 is not sufficient to return the coffee liquor through a clogged foraminous sheet 31. In some instance when using water of high mineral content, the solution remained in the upper vessel 11 for longer than one hour when the filter assembly did not have the benefit of by-pass openings 34. Under similar circumstances the by-pass openings 34 would always permit the coffee liquor to be drawn in the lower vessel 13 within 5 minutes. When the foraminous sheet is unclogged, it should be appreciated that the openings 34 have a negligible effect on the filtering action. It can be readily understood that the number and configuration of by-pass openings 34 can be varied and still produce the same desirable results by maintaining an area relationship of approximately 1/1000 between the by-pass 34 and the total openings in foraminous sheet 31. Therefore, when the water is low in mineral contamination, the by-pass opening 34 being of such a small area with respect to the total openings in foraminous sheet 31, has only a minor effect. When the water contains numerous impurities, the by-pass 34 will allow the coffee liquor to enter the lower vessel 13 in a reasonably short time.

In the preferred embodiment of this instant invention, the total area of by-pass openings 34 is .002 square inch. It has been determined through experiments that if the area of by-pass opening 34 is increased appreciably above this amount then an objectionable amount of sediment is allowed to pass even when the foraminous sheet 31 remains unclogged. If the area of opening 34 is appreciably smaller than .002 square inch the time required for the coffee liquor to return to the lower vessel 13 is objectionably long when the foraminous sheet 31 is clogged.

In order to prevent the by-pass opening 34 from being obstructed by large coffee grounds, the apertures 22 in the perforated disk assembly 21 are smaller than the by-pass openings 34. Thus any object which passes through the apertures 22 would be of such size that it also would pass through the by-pass opening 34. The location of the by-pass opening 34 in stainless steel filter bushing 32 affords the added advantage of ruggedness and virtual freedom from damage in operation or in handling to ensure trouble free service. Naturally filter bushing 32 may be fabricated of materials with similar characteristics to produce the identical results.

Referring to FIG. 2 of the drawings, the complete filter 20 is shown assembled to the upper vessel 11. In addition to the perforated disk assembly 21 and foraminous filter assembly 30, there is the elongated filter assembly rod 23 which includes a filter rod 17 and a filter rod compression spring 18. In the assembled position, the rod spring 18 which is slidably received on the rod 17 is retained thereon by means of the upper end of spring 18 which is formed to pass through a hole 19 extending diametrically through rod 17 to prevent axial movement of the upper end of the spring relative to the rod 17. The lower end of spring 18 is seated against disk eyelet 24 in order to maintain sufficient compression between the perforated disk assembly 21, gasket 28, and the bottom portion of upper vessel 11 to ensure proper sealing action.

The filter rod 17 has a hook 17a at its lowermost end which is adapted to engage the lower end 15a of conduit 15. In order that the assembly rod 17 will be vertically positioned in the center of the upper vessel 11, a bend 17b is provided to compensate for the axial displacement of any selected portion of the conduit end 15a from the axis of the upper vessel 11.

To assemble the filter 20 to the upper vessel 11, the filter is passed through the open mouth of the upper vessel 11 so that the lower gasket lip 29 engages the bottom of the upper vessel and encircles the well 14 in the bottom thereof. The positioning fingers 41 projecting from the supporting frame 37 loosely contact the sides of the well 14 and aid in assembling the filter within the upper vessel 11. The handle portion 17c of filter rod 17 is then depressed against the action of the spring 18 until hook 17a has been extended below the end 15a of conduit 15. A small sidewise movement of the handle 17c then engages the hook 17a with the end 15a to complete the assembly of the filter 20 to the upper vessel 11.

In the operation of this filter, a quantity of hot water is first forced upwardly inside the conduit 15 and through the foraminous sheet 31 and perforated disk 21 into the upper vessel 11. After the hot water and coffee have been brought together in the upper vessel 11 and brewed for a predetermined time, a vacuum is created in the lower vessel 13 by the cooling of the vapor therein which causes the solution in the upper vessel 11 to be forced through the filter assembly 20. The coffee grounds are retained on top of the perforated disk 21 since the apertures 22 are of smaller dimension than the normal coffee grounds. The coffee liquor is further filtered by passing through the foraminous sheet 31 on its journey to the lower vessel 13. Only a very small percentage of the coffee liquor is allowed to pass through the by-pass opening 34 due to its very small passageway in comparison to the large effective area of the total openings in foraminous sheet 31 which is approximately in the ratio of 1 to 1000 in a preferred embodiment. If the foraminous filter 31 becomes clogged or inoperative for any reason during the filtering cycle, the by-pass 34 will allow the coffee liquor to pass therethrough and maintain the time required for the coffee liquor to return to the lower vessel 13 within reasonable limits.

In considering the filtering action obtained in the above-described unit, one should recognize that since the by-pass openings 34 are relatively large as compared to the individual openings in screen or sheet 31, there will be a tendency for openings 34 to permit passage to the lower vessel of sediment, finely ground coffee and the like. Since sediment and finely ground coffee are considered undesirable by most coffee connoisseurs, the use of a filter having openings sufficiently large to permit passage of these materials has not been accepted.

It should also be appreciated, however, that in instances in which a filter having only the desired small size openings will not function at all, certain compromises must be made as to the quality of the filtered liquor so that the filtering may be performed expediently. The instant invention contemplates maintaining the relative total area of the large holes 34 small as compared to the total area of the holes in the foraminous sheet 31. When the ratio of the area of large holes to the area of the small holes is maintained at less than 1:500, it has been found that the large holes have relatively little effect on the quality of the coffee when the sheet 31 is operating properly. In instances when sheet 31 becomes clogged, however, the large holes 34 are adequate to filter the coffee liquor very expediently.

While there have been shown and described particular embodiments of the present invention, it will be apparent to those skilled in the art that various modifications may be made without departing from the invention in its broader aspects and it is, therefore, aimed in the appended claims to cover all such changes and modifications as fall within the true spirit and scope of the present invention.

What is claimed as new and desired to be secured by Letters Patent of the United States is:

1. In a vacuum coffee maker of the type having an upper vessel for receiving coffee grounds, a lower vessel within which water may be heated, and conduit means extending from said upper vessel into said lower vessel to a point adjacent the bottom thereof for transferring heated water from said lower vessel into said upper vessel, an improved filter positioned across said conduit to retain said grounds in said upper vessel while permitting the brewed coffee to return to said lower vessel, said filter comprising a vertically extending assembly rod having the lower end formed for engagement with the lower end of said conduit, a filter element of screen material, a supporting frame for said screen material, a bushing slidably received on said rod and supporting said element and said frame, a gasket member extending around the periphery of said element for sealing engagement with said upper vessel, spring means biasing said filter element downwardly, and a by-pass opening in said bushing adjacent said rod.

2. The filter of claim 1 wherein said by-pass opening being smaller than one five hundredth the area of the total openings in said screen material.

3. A coffee maker filter comprising a foraminous sheet of material supported by a frame member, a filter seal connected around the periphery of said sheet and engageable with an annular surface, locking means for maintaining said seal in engagement with said surface, said frame member being provided with at least one by-pass opening unobstructed by said sheet, said by-pass opening being substantially larger than the individual openings in said foraminous material, the total area of the openings in said foraminous material being substantially greater than the area of said by-pass opening.

4. A coffee maker filter comprising a foraminous sheet of material supported by a frame member, a filter seal connected around the periphery of said sheet and engageable with an annular surface, locking means for maintaining said seal in engagement with said surface, said frame member being provided with at least one by-pass opening unobstructed by said sheet, the total area of the openings in said foraminous sheet being at least five hundred times the area of said by-pass opening.

5. In a vacuum coffee maker of the type having an upper vessel for receiving the coffee grounds, a lower vessel within which water may be heated, and conduit means extending from said upper vessel into said lower vessel to a point adjacent the bottom thereof for transferring heated water from said lower vessel into said upper vessel, an improved filter positioned across said conduit to retain said grounds in said upper vessel while permitting the brewed coffee to return to said lower vessel, said filter comprising a foraminous sheet of material covering the passageway between said lower and upper vessel, locking means for maintaining said sheet in said position, said filter being provided with at least one by-pass opening unobstructed by said sheet and positioned for allowing the return of brewed coffee into said lower vessel, the total area of the openings in said foraminous sheet being at least five hundred times the area of said by-pass opening.

6. In a vacuum coffee maker of the type having an upper and lower vessel with a conduit means extending from said upper vessel into said lower vessel, an improved filter positioned across said conduit, said filter comprising a foraminous sheet of material covering the passageway between said lower and upper vessel, locking means for maintaining said sheet over said passageway, said foraminous sheet being provided with at least one by-pass opening positioned for allowing brewed coffee to enter said lower vessel when said sheet is inoperative, the total area of said by-pass being approximately .002 square inch.

7. In a vacuum coffee maker of the type having an upper vessel for receiving coffee grounds, a lower vessel within which water may be heated, and conduit means extending from said upper vessel into said lower vessel to a point adjacent the bottom thereof for transferring heated water from said lower vessel into said upper vessel, an improved filter positioned across said conduit to retain said grounds in said upper vessel while permitting the brewed coffee to return to said lower vessel, said filter comprising a vertically extending assembly rod having the lower end formed for engagement with the lower end of said conduit, a perforated disk slidably received on said rod and having apertures to permit coffee liquor to pass therethrough but to retain the normal size coffee grounds, a filter element of fine screen material for allowing the coffee liquor to pass therethrough but for retaining the sediment and fine coffee grounds passed through said perforated disk, a supporting frame for said screen material, a bushing slidably received on said rod and supporting said element and said frame between said perforated disk and the bottom of said upper vessel, a gasket member extending around the periphery of said element for sealing engagement with said perforated disk and said upper vessel, a spring means biasing said perforated disk, said gasket, and the bottom portion of said upper vessel into sealing engagement, and a by-pass opening in said bushing adjacent to said rod, said opening being larger than said disk apertures.

8. A coffee maker filter comprising a perforated disk, a foraminous sheet of material supported by a frame member, a filter seal connected around the periphery of said sheet and engaging said perforated disk on one side and an annular surface on the other side, said frame member being provided with at least one opening unobstructed by said sheet for allowing brewed coffee to by-pass said sheet, the area of the total openings in said foraminous sheet being at least five hundred times the area of said by-pass opening.

9. A coffee maker filter comprising a perforated disk, a foraminous sheet of material supported by a frame member, an annular gasket connected around the periphery of said sheet and sealing the space between said disk and said sheet, the perforations in said disk being substantially larger than the holes in said foraminous material, and a by-pass opening provided in said frame being unobstructed by said sheet for allowing a passageway which completely circumvents said sheet, said by-pass opening being larger than the perforations in said disk.

10. A filter for a vacuum type coffee maker having an upper and lower vessel with a conduit means extending from said upper vessel into said lower vessel, said filter comprising a perforated disk and a foraminous sheet of material covering said conduit, and a filter seal extending around the periphery of said sheet and engageable with said perforated disk and the inside wall of said upper vessel adjacent to the conduit, said foraminous sheet being provided with at least one by-pass opening, said by-pass opening being smaller than one five hundredth the total area of openings in said foraminous sheet.

11. A vacuum type coffee maker filter comprising a perforated disk, a foraminous sheet of material, means for supporting said sheet in the coffee maker, a sealing means extending around the periphery of said sheet and sealing the space between said disk and said sheet, the perforations in said disk being substantially larger than the filtering holes in said foraminous sheet, and at least one by-pass opening provided in said sheet for completely circumventing said sheet, said by-pass being larger than each filtering hole in said sheet and the perforations in said disk.

References Cited in the file of this patent

UNITED STATES PATENTS

| | | |
|---|---|---|
| 1,396,685 | Houck | Nov. 8, 1921 |
| 1,406,814 | Baker | Feb. 14, 1922 |
| 1,978,074 | Bogoslowsky | Oct. 23, 1934 |
| 2,143,270 | Huber | Jan. 10, 1939 |
| 2,738,073 | Jepson | Mar. 13, 1956 |
| 2,955,651 | Replogle | Oct. 11, 1960 |